US012157455B2

(12) United States Patent
Myklebust et al.

(10) Patent No.: US 12,157,455 B2
(45) Date of Patent: Dec. 3, 2024

(54) TIRE STIFFNESS ESTIMATION AND ROAD FRICTION ESTIMATION

(71) Applicant: NIRA Dynamics AB, Linköping (SE)

(72) Inventors: Christer Andreas Myklebust, Linköping (SE); Tobias Carl Wilhelm Hammarling, Vreta Kloster (SE)

(73) Assignee: NIRA Dynamics AB, Linköping (SE)

( * ) Notice: Subject to any disclaimer, the term of this patent is extended or adjusted under 35 U.S.C. 154(b) by 559 days.

(21) Appl. No.: 17/413,484

(22) PCT Filed: Dec. 9, 2019

(86) PCT No.: PCT/EP2019/084167
§ 371 (c)(1),
(2) Date: Jun. 11, 2021

(87) PCT Pub. No.: WO2020/120375
PCT Pub. Date: Jun. 18, 2020

(65) Prior Publication Data
US 2022/0073042 A1 Mar. 10, 2022

(30) Foreign Application Priority Data

Dec. 13, 2018 (DE) .......................... 102018132157.0

(51) Int. Cl.
*B60T 8/1763* (2006.01)
*B60T 8/172* (2006.01)
*B60W 40/068* (2012.01)

(52) U.S. Cl.
CPC ............ *B60T 8/1763* (2013.01); *B60T 8/172* (2013.01); *B60W 40/068* (2013.01);
(Continued)

(58) Field of Classification Search
CPC ...... B60T 8/172; B60T 8/1725; B60T 8/1763; B60T 8/17551; B60T 8/17636;
(Continued)

(56) References Cited

U.S. PATENT DOCUMENTS

| 5,774,821 A * | 6/1998 | Eckert ................. B60W 40/064 701/72 |
| 8,666,562 B2 * | 3/2014 | Tuononen ............... B60T 8/172 701/1 |
| 9,340,211 B1 * | 5/2016 | Singh ..................... B60T 8/1725 |
| 9,650,053 B2 * | 5/2017 | Singh ..................... B60W 40/10 |
| 9,751,533 B2 * | 9/2017 | Singh ..................... B60T 8/172 |
| 2003/0144777 A1 * | 7/2003 | Schmitt ................. B60T 8/1725 701/31.4 |

(Continued)

FOREIGN PATENT DOCUMENTS

| AT | 516629 B1 | 7/2016 |
| CN | 105378448 A | 3/2016 |

(Continued)

OTHER PUBLICATIONS

PCT International Search Report and Written Opinion, Application No. PCT/EP2019/084167, dated Mar. 9, 2020, 13 pages.
(Continued)

*Primary Examiner* — Thomas J Williams
(74) *Attorney, Agent, or Firm* — Mahamedi IP Law LLP

(57) ABSTRACT

Methods, computer program products and apparatuses for estimating the uncertainty of a friction potential value of a wheel of a vehicle are disclosed. The method for estimating the uncertainty of a friction potential value of a wheel of a vehicle comprises obtaining a range of tire models (72). The method further comprises receiving a sensor signal (74) indicative of at least one actual tire-related value. Finally, a friction uncertainty value is calculated (76) based on the received sensor signal and the range of tire models. The friction uncertainty value is indicative of the uncertainty of the friction potential.

14 Claims, 8 Drawing Sheets

(52) U.S. Cl.
CPC ....... *B60T 2210/12* (2013.01); *B60T 2270/86* (2013.01); *B60W 2552/40* (2020.02); *B60Y 2400/30* (2013.01)

(58) Field of Classification Search
CPC ............. B60T 2210/12; B60T 2270/86; B60T 2240/03; B60W 40/068; B60W 2552/40; B60Y 2400/30
See application file for complete search history.

(56) References Cited

U.S. PATENT DOCUMENTS

| | | | |
|---|---|---|---|
| 2011/0264300 A1 | 10/2011 | Tuononen | |
| 2016/0123866 A1* | 5/2016 | Leo | B60T 8/172 73/9 |
| 2018/0319404 A1* | 11/2018 | Jonasson | B60W 10/18 |
| 2020/0271550 A1* | 8/2020 | Svantesson | G01N 19/02 |
| 2022/0073042 A1* | 3/2022 | Myklebust | B60W 40/068 |

FOREIGN PATENT DOCUMENTS

| | | |
|---|---|---|
| CN | 106256645 A | 12/2016 |
| DE | 19515047 A1 | 5/1996 |
| DE | 19855332 A1 | 6/2000 |
| DE | 102005046612 A1 | 4/2007 |
| DE | 102007039617 A1 | 2/2009 |
| DE | 102016203545 A1 | 9/2017 |
| EP | 1760451 A1 | 3/2007 |
| JP | 2000043745 A | 2/2000 |
| JP | 2012503192 A | 2/2012 |
| KR | 20180109881 A | 10/2018 |
| WO | 2010031905 A1 | 3/2010 |
| WO | 2017102086 A1 | 6/2017 |

OTHER PUBLICATIONS

German Patent and Trademark Office, Office Action, DE Application No. 102018132157.0, mailed Oct. 2, 2019, 10 pages.
Japan Patent Office, Office Action, JP Application No. 2021-529295, mailed Jun. 21, 2022, 8 pages.
Korean Intellectual Property Office, Office Action, KR Application No. 10-2021-7017425, mailed Dec. 16, 2022, 24 pages.
China National Intellectual Property Administration, Office Action, CN Application No. 201980080623.5, mailed Feb. 11, 2023, 14 pages.
European Patent Office, Office Action, EP Application No. 19820698.9, mailed Jun. 21, 2023, 4 pages.

* cited by examiner

TIRE STIFFNESS ESTIMATION AND ROAD FRICTION ESTIMATION

TECHNICAL FIELD

The present invention disclosure generally relates to the area of estimating friction between a tire and a road surface and to the area of estimating tire properties in wheeled vehicles. In particular, it relates to methods, systems and computer program products for estimating the uncertainty of a friction potential value.

BACKGROUND OF THE INVENTION

Road friction may vary abruptly, e.g. from icy to dry or wet stretches of road. These changes pose a significant challenge to the driver and his or her safety and comfort. From a technical point of view, reliable knowledge of road friction is crucial for implementing vehicle control systems, such as Anti-lock Braking System (ABS). Knowledge of the available friction potential may for example be used to optimize the brake distance if an ABS braking needs to be conducted. Additionally or alternatively, friction may be used by one or more of a variety of systems, including autonomous driving, adaptive cruise control, slippery road detection and connected driving.

Conventional approaches to estimate or calculate road friction may be based on slip, sound, tire tread deformation, road roughness and lubricant detection. Generally, these approaches have been developed to increase estimation accuracy, e.g. by combining the quantity or quality of input measurements. For instance, slip-based approaches often take into account estimated tire stiffness for increased accuracy. Further, estimates coming from an ABS, TCS or ESP intervention may also provide information since the entire friction potential is used. However, during actual driving, the calculation must often be carried out with incomplete or imprecise knowledge about tires and operating conditions.

Conventional approaches have been geared towards estimating a friction potential without outputting a measure of uncertainty, i.e. how reliable their estimates are. However, the quality of subsequent control of the vehicle, e.g. assuring a large enough distance to the car in front to allow for a full ABS braking without collision, can only be as good as the basis for decision-making, e.g. the determined friction potential.

OBJECT OF THE INVENTION

In order to overcome shortcomings of known approaches, particularly of the kind mentioned above, an object of the present invention is to provide solution for providing an uncertainty measure for an estimated friction.

SUMMARY OF THE INVENTION

Methods, computer program products and apparatuses for estimating the uncertainty of a friction potential value of a wheel of a vehicle are disclosed.

Generally, the invention makes use of tire models and actual tire-related values. A tire model is understood as a representation of the physical behavior of a wheel or a tire and is unique to every tire in a given operating condition. As such, it is possible to determine or estimate relevant physical properties. Input to the tire model may be provided as actual tire-related value(s) as described further below.

For the sake of the present disclosure, a tire model shall at least be capable of determining or estimating a friction potential based on given input. One example of a tire model to draw conclusions about the friction potential utilizes measurements of wheel speeds and other sensors. The friction potential can then be derived e.g. from the slip-slope using the tire model.

Generally, the method for estimating the uncertainty of a friction potential value of a wheel of a vehicle comprises obtaining a range of tire models. A range of tire models includes at least two tire models The method further comprises receiving a sensor signal indicative of at least one actual tire-related value. Generally, the presently disclosed methods may be practiced with one or more of a variety of actual tire-related values. Preferably, the tire-related value may be used as an input to a tire model. Providing an actual value as an input to a tire model narrows down the lack of knowledge about the tire and operation conditions.

Examples of actual tire-related value may be selected from the group consisting of: slip, (normalized) traction force, ambient temperature, tire temperature, tire pressure, longitudinal acceleration, lateral acceleration, yaw rate, wheel speed, vehicle speed, engine speed, engine torque, torque applied on the wheel, ABS flag, steering wheel angle, wheel angles, suspension height, suspension pressure, axle height, brake pressure, brake temperature, brake torque, a tire type (manually entered via a human-machine-interface), GPS information, road wetness, road conditions, gearbox signals, wiper speeds, an estimated friction potential from an ABS braking, an estimated friction potential from a TCS event, an estimated friction potential received from vehicle connectivity, a flag value from a control flag register.

Examples of flags of the control flag register include indications whether ESC control is in progress, ABS Braking is in progress, TCS is in progress, braking is in progress, a gear shift is in progress, the clutch pedal is engaged, a reverse gear is engaged, a trailer is connected, or a cruise control is engaged.

A vehicle bus may relay information and provide one or more of the parameters above.

Finally, the method comprises calculating a friction uncertainty value based on the received sensor signal and the range of tire models. The friction uncertainty value is indicative of the uncertainty of the friction potential.

Preferably, the range of tire models comprises a lower bound tire model and an upper bound tire model.

In such cases, the calculating of the friction uncertainty values may include estimating a lower bound friction value and an upper bound friction value. The lower bound friction value is estimated based on the received sensor signal and the lower bound tire model, whereas the upper bound friction value is estimated based on the received sensor signal and the upper bound tire model. For instance, the friction uncertainty value may be calculated based on a difference of the upper bound friction value and the lower bound friction value.

In some examples, the range of tire models is not necessarily represented by two discrete boundary models, but by an average model and a model uncertainty. In such cases, the obtaining may include obtaining (or estimating) a tire model uncertainty, which is indicative of an uncertainty of the range of tire models. Further the calculating of the friction uncertainty value is based on the tire model uncertainty value.

Generally, the method may be carried out irrespective of the particular sensor used, given that the sensor provides a signal indicative of an actual tire-related value. Examples of suitable sensors, which may provide actual tire-related values as sensor signals include one or more of the following:
a wheel speed sensor, a vehicle speed sensor, a torque sensor, a pressure sensor, one or more accelerometers, a yaw rate sensor, a steering angle sensor, a temperature sensor, a torque distribution device, a GPS sensor, a camera, a vehicle bus.

In some embodiments, a measurement uncertainty value, which is indicative of an uncertainty of the actual tire-related value, may be received or estimated. In such cases, the calculating of the friction uncertainty value may be based further on the measurement uncertainty value.

For instance, the sensor signal and the measurement uncertainty value are indicative of a measurement range comprising a series of actual tire-related values. The measurement range of actual tire-related values may be defined as a continuous range between a measurement minimum and a measurement maximum. In other cases, it may be defined as a discrete set of multiple values. Further, it may be defined as a distribution of values, indicative of the relative prevalence of the values within the measurement range.

In general, the method may or may not comprise estimating a friction potential value.

In any case, any output of the method may be provided to a vehicle bus, in particular for use in an active control system, such as ABS, TCS, ESC etc. Such output provided to the vehicle bus may include one or more of the following: the calculated friction uncertainty value, the estimated lower bound friction value and/or upper bound friction value; the estimated friction potential value.

In some embodiments, the method may further comprise updating the range of tire models. For instance, when a measurement is inconsistent with the obtained range of tire models, it may be assumed that either the measurement or the range of tire models is incorrect. In some embodiments, the range of tire models may be updated based on the measurement. For instance, a measurement of friction used may show an inconsistency with a tire model, if the measured friction used exceeds the friction potential determined using the tire model.

The updating of the range of tire models may involve in particular updating parameters of the range of tire models. In general, any of the quantities mentioned above as examples of tire-related values may be updated.

Further, use of an uncertainty of a friction potential value of a wheel of a vehicle disclosed, which friction potential value has been estimated with a method according to one of the preceding claims and is used for controlling the vehicle.

For instance, in one embodiment, the uncertainty of the friction potential may be used for controlling the vehicle using an adaptive cruise control system. Adaptive cruise control systems inter alia control the speed of the vehicle in order to ensure a certain distance to another vehicle, which is in front of the vehicle to be controlled. Said distance may be determined dynamically based on estimates of friction potential. By also using the uncertainty of the friction potential, becomes possible to adjust (e.g. increase) said distance to account for said (e.g. high) uncertainty.

Further, a computer program product is disclosed, which includes program code configured to, when executed in a computing device, carry out the steps of one of the disclosed methods.

Finally, an apparatus is disclosed, which comprises a processing unit. The processing unit is configured to perform the steps of one of the methods as disclosed herein.

SHORT DESCRIPTION OF THE DRAWINGS

DETAILED DESCRIPTION OF PREFERRED EMBODIMENTS

In the following, description is given of a few preferred embodiments, wherein—for illustration purposes—slip is chosen as an exemplary tire-related value. Other tire-related values may be used instead or additionally. In particular, for illustration, the methods described in the following make use of a single tire-related value (slip) although other embodiments make use of two, three or any number of tire-related values. In the latter cases, the tire-related values may be grouped or combined in a multi-dimensional quantity, such as a vector.

A friction potential is generally defined as the maximum of a slip curve and depends on a variety of variables, such as road surface and tire characteristics and operating condition (pressure, temperature, vertical load, wear, etc.).

Figure 1:
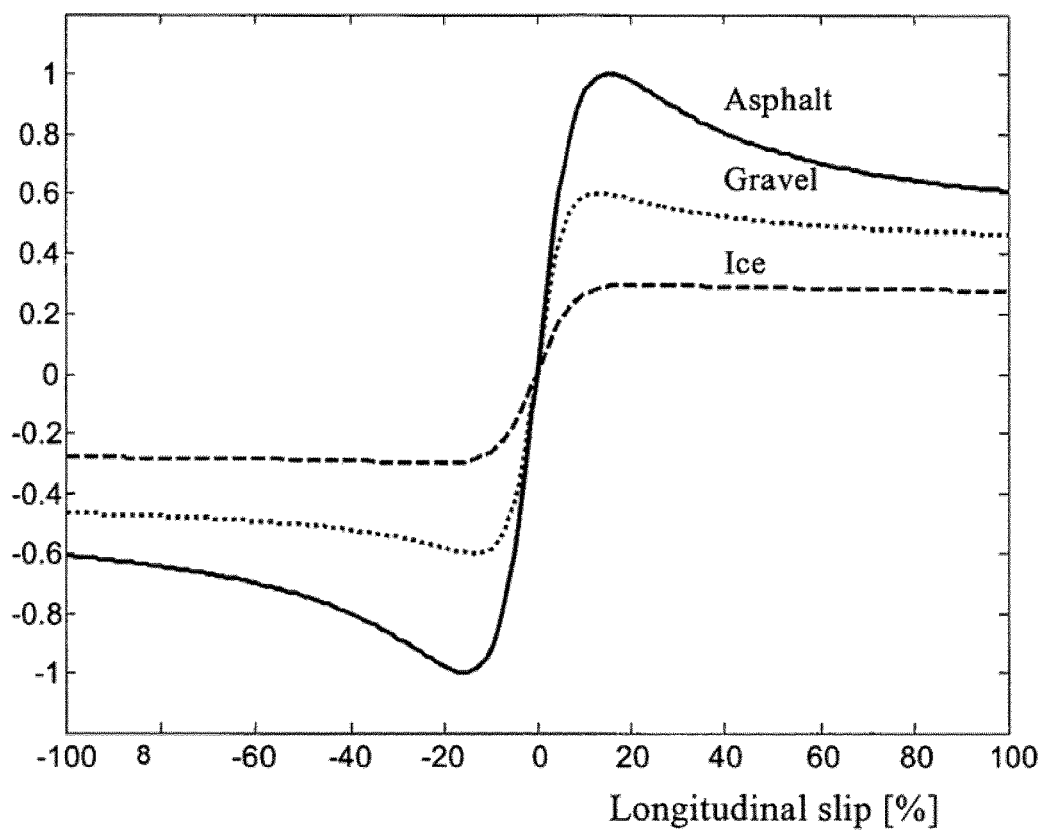
FIG. 1 is a graph representing typical (normalized) traction forces as a function of slip for a variety of road surfaces with different friction potential.

FIG. 1 illustrates the dependence of friction potential on road surface. The graph shows normalized traction forces (ordinate axis) as a function of longitudinal slip (abscissa axis). Slip s of the wheel may for instance be computed based on a sensor signal originating from a wheel speed sensor, according to the relationship $$s = \frac{\omega r}{v} - 1$$

wherein $\omega$ is a rotational frequency of the wheel, r is a radius of the wheel and v is a translational velocity of the vehicle.

Normalized traction force $\mu$ of the wheel may for instance be computed based on the relationship $$\mu = \frac{F}{N}$$

wherein F is a traction force and N is a normal force acting on the wheel.

The relationship between normalized traction force and longitudinal slip is exemplified in FIG. 1 for three road surfaces, namely on ice, gravel and asphalt. As displayed, the friction potential on asphalt is generally higher than on gravel, whereas the friction potential on gravel is higher than on ice. In FIG. 1 as well as in the rest of the present disclosure, all quantities and values (in particular slip) are understood to refer to the longitudinal and/or lateral direction, unless otherwise noted. A slip curve may be divided in multiple regions, including an approximately linear portion around the origin, e.g. from −10% to +10% of slip in FIG. 1.

The methods described in the following provide ways to estimate an uncertainty of a friction potential value.

Figure 2:
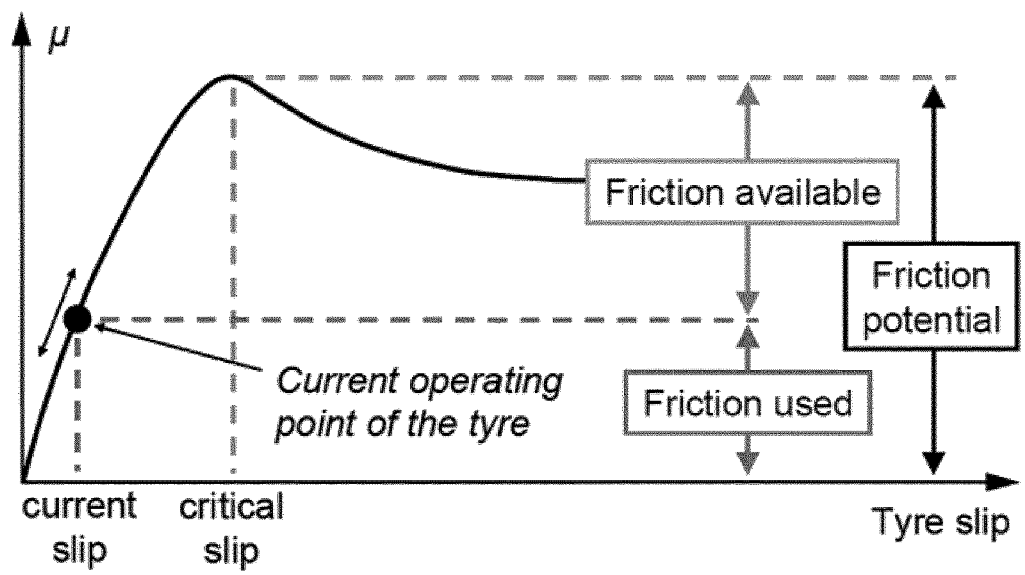
FIG. 2 is a graph representing friction used, friction available and friction potential.

FIG. 2 is a graph representing friction used, friction available and friction potential. The graph is a slip curve illustrating the relationship between slip and traction for a given tire model.

Considering FIG. 2, a typical driving situation is indicated by a current operating point in the linear portion at low slip. The current slip and normalized traction force may be used to estimate the slope of the slip-u curve in the linear portion (slip-slope).

Based on this estimate, the friction potential of the tire may be inferred. The friction potential of the tire corresponds to the maximum or peak of the curve. The corresponding slip is denoted as critical slip. Given a current operating point of the tire on the curve, the abscissa value corresponds to the friction used, whereas the difference to the maximum friction (friction potential) is termed available friction.

Figure 3:
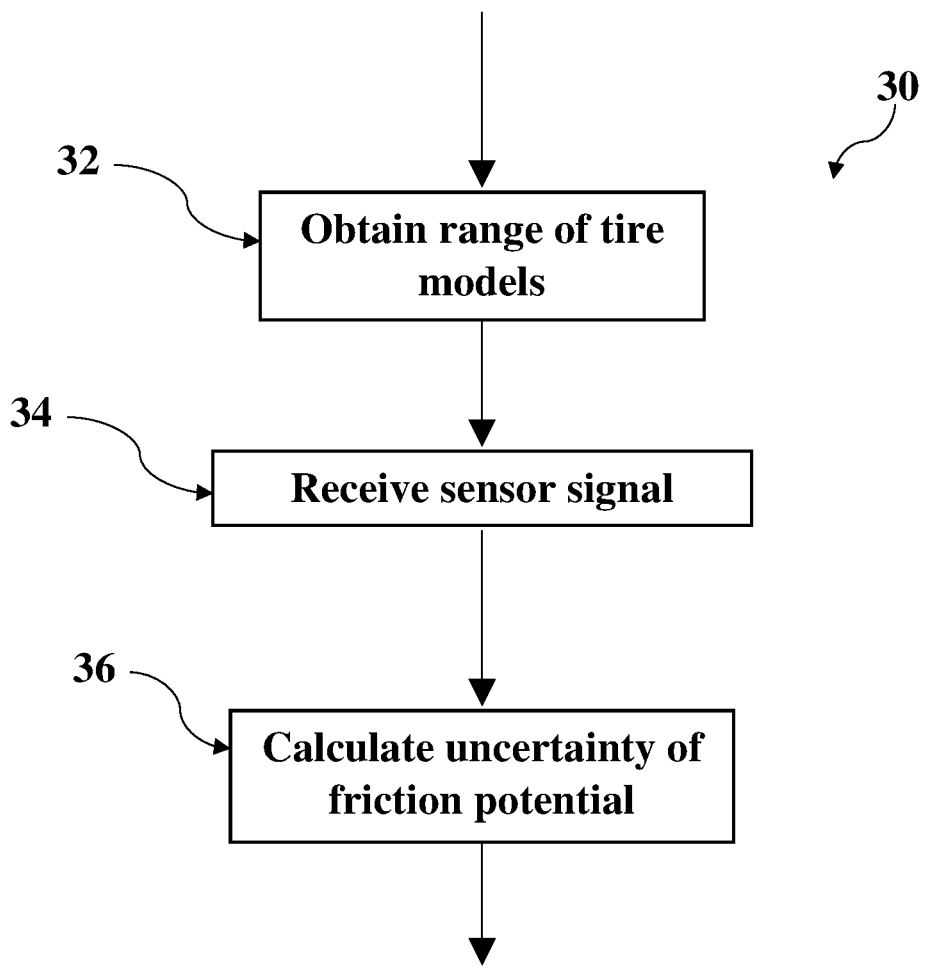
FIG. 3 is a flow chart of a method according to embodiments.

FIG. 3 is an exemplary flow chart of a method 30 for estimating the uncertainty of a friction potential value of a wheel of a vehicle. Method 30 comprises obtaining 32 a range of tire models.

Method 30 further comprises receiving 34 a sensor signal. The sensor signal is indicative of at least one actual tire-related value. In the present example, the sensor signal may for instance be indicative of slip of the wheel. Slip may for instance be indicated by a wheel speed sensor signal.

However, the present disclosure is not restricted to a wheel speed sensor signal as an exemplary sensor signal or to slip as an exemplary tire-related value, as one of ordinary skill in the art recognizes.

For instance, other examples of actual tire-related value include traction force, temperature (ambient temperature, tire temperature), tire inflation pressure, longitudinal acceleration, lateral acceleration, yaw rate, ABS flag, steering wheel angle, brake pressure(s).

The tire-related values may be used as an input to each of the tire models. Based on this input, each of the tire models may then be used to estimate a friction potential. As a result, with a single actual tire-related value, e.g. a single measurement of slip, the method 30 allows to estimate a range of friction potential values.

Finally, the method comprises calculating 36 a friction uncertainty value based on the received sensor signal and the range of tire models, indicative of the uncertainty of the friction potential. In particular, the friction uncertainty value may be calculated on the basis of a range of estimated friction potential values.

According to the present disclosure, not only a single tire model, but a range of tire models, is used. For instance, a respective friction potential value may be estimated for each one of the tire models in the range of tire models. In other examples, respective friction potential values may be estimated for at least two tire models out of the range of tire models. In such cases, the uncertainty of the friction potential may be calculated as the difference between these friction potential values, as will be described in detail further below, in particular with reference to FIG. 4.

Figure 4:
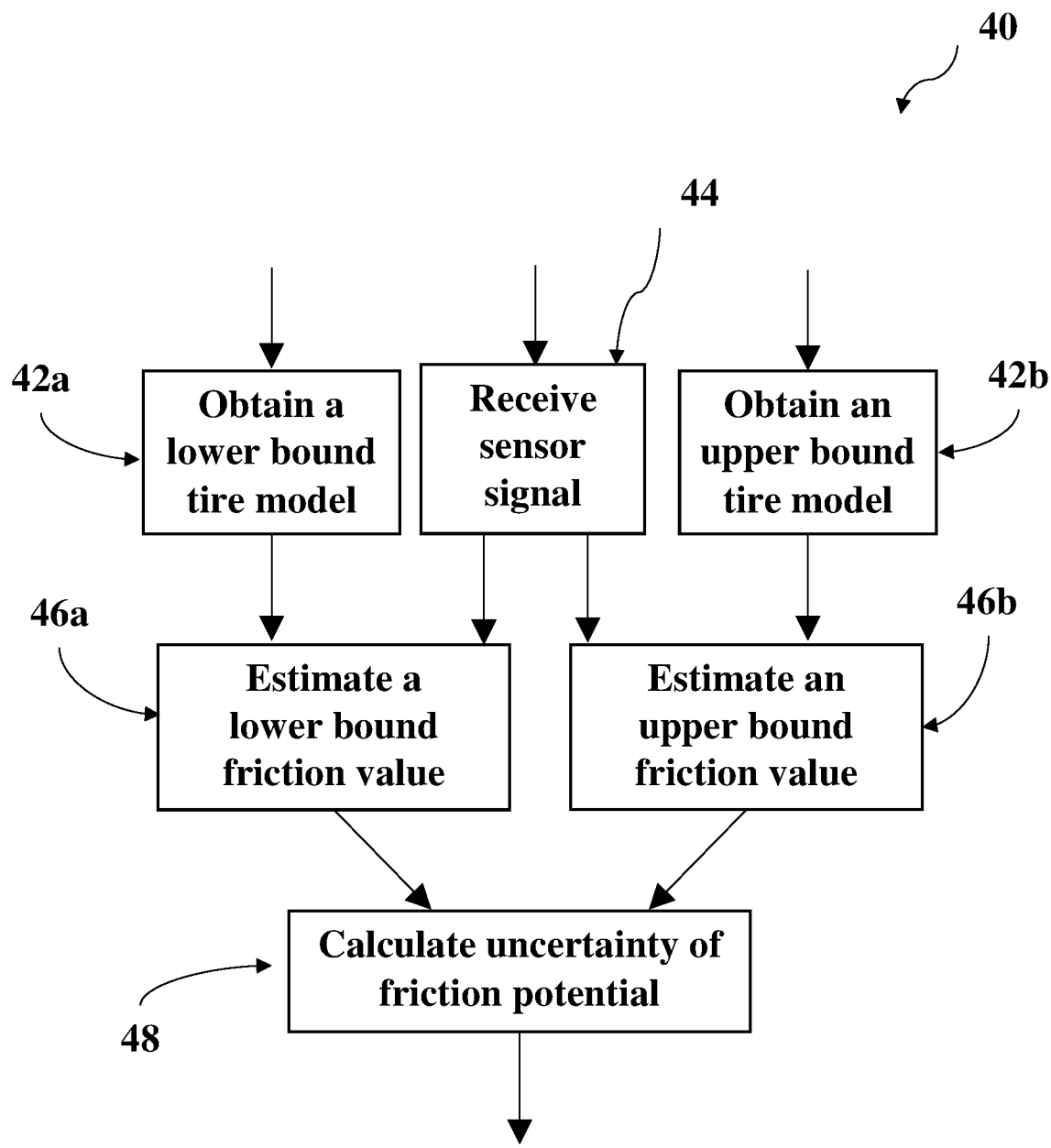
FIG. 4 is a flow chart of a method according to embodiments.

FIG. 4 is an exemplary flow chart of another method 40 for estimating the uncertainty of a friction potential value of a wheel of a vehicle. Method 40 comprises obtaining 42a a first tire model, which is also referred to as a lower bound tire model. Further, the method 40 comprises obtaining 42b a second tire model, which is also referred to as an upper bound tire model. The first and second tire models form a range of tire models.

In particular, the first and second tire models may be provided as estimates of how the tire may behave. They may be generic hypotheses for a broad range of tires and operating conditions, e.g. ranging from soft to stiff tires, ranging from high to low operating temperatures, ranging from performance tires to winter tires. Alternatively or additionally, these hypotheses may have been refined empirically, as will be described further below. By way of empirics, the range of tire models may have been refined (i.e. narrowed down) from the generic hypotheses or broadened from the generic hypothesis or shifted from the generic hypotheses, or any combination of the preceding. In any case, the method according to the present disclosure allows for quantifying the uncertainty in friction potential corresponding to this lack of knowledge about the tires and operating conditions.

Preferably, the lower bound tire model is the one of the two tire models, which typically yields a lower friction potential, i.e. the more slippery of the two models. The upper bound tire model is then the one of the two tire modes, which typically yields a higher friction potential, i.e. the more traction-developing of the two models.

Method 40 further comprises receiving 44 a sensor signal. The sensor signal is indicative of an actual tire-related value, which may be used as an input to both the lower bound tire model and the upper bound tire model.

One the one hand, the sensor signal (or at least the actual tire-related value indicated therein) is used to estimate 46a a first friction value, also referred to as a lower bound friction value, using the first tire model. In parallel or sequentially, the sensor signal or the actual tire-related value is used to estimate 46b a second friction value, also referred to as an upper bound friction value, using the second tire model.

Preferably, the lower bound friction value is smaller than the upper bound friction value.

Based on the lower and upper bound friction values, an uncertainty value, indicative of an uncertainty of the friction potential, may be determined.

Generally, the uncertainty will depend on the breadth of the obtained range of tire models. If the tire models are highly divergent, i.e. if there is little knowledge about the actual properties of the tires and the operating conditions, the uncertainty will be larger than with closely similar tire models. With the methods disclosed herein, it is possible to quantify this breadth of lack of knowledge and provide it to other systems within or outside the vehicle. For instance, a vehicle control system, such as ABS, may profit from a quantification of the uncertainty of the friction potential.

Figure 5:
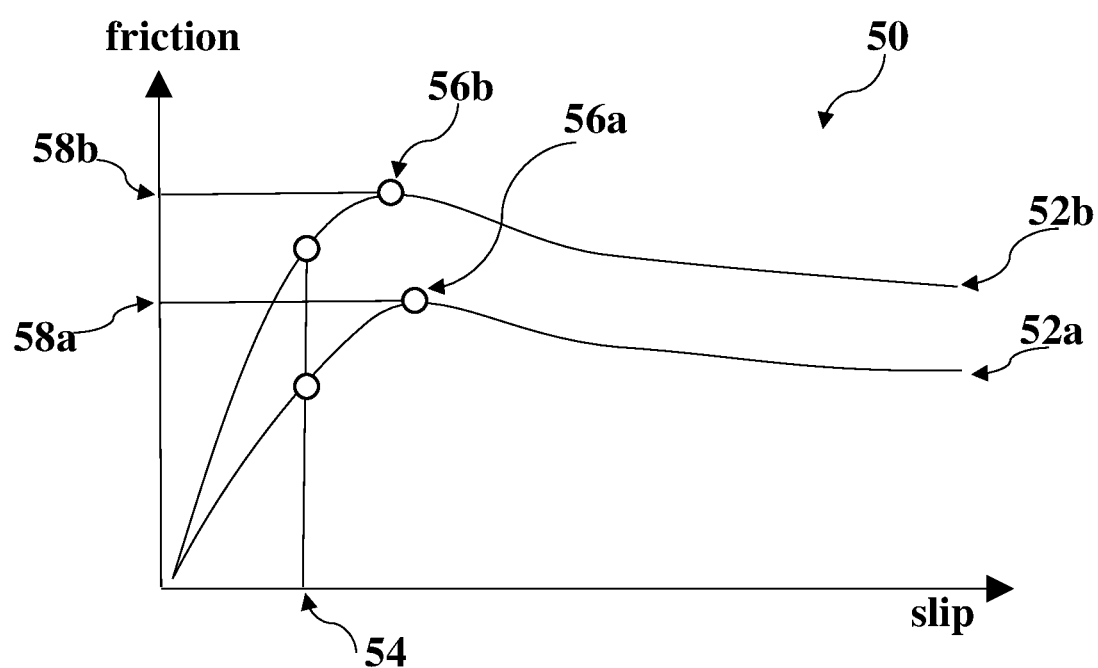
FIG. 5 is a graph illustrating an example of a method according to embodiments.

FIG. 5 is a graph 50 illustrating "slip curves", i.e. a dependence of traction forces versus slip, similar to FIG. 2. The graph 50 serves to illustrate an exemplary use of the method described above with reference to FIG. 4.

First, two tire models 52a, 52b are obtained. The first tire model 52a is a lower bound tire model, whereas the second tire model 52b is an upper bound tire model.

In the example shown, the lower bound tire model 52a is below the upper bound tire model 52b over the entire slip range. Thus, the friction offered according to the lower bound tire model 52a is smaller than the friction offered by the upper bound tire model.

The difference or area between the lower bound tire model 52a and the upper bound tire model 52b is indicative of an uncertainty about the tire or operation conditions. For instance, the lower bound tire model may be based on the assumption that the vehicle is navigating on a slippery road or gravel, whereas the upper bound tire model 52b may be based on the assumption that the vehicle is navigating on a less slippery road, such as asphalt.

As long as this parameter (gravel or asphalt) remains unknown, it is advantageous to be aware of the resulting uncertainty of friction potential. Thus, according to the present method, the uncertainty in friction potential may be calculated as follows.

In addition to the two tire models, a sensor signal is received. The sensor signal is indicative of a tire-related value, namely slip in the case of FIG. 5. The actual slip value indicated by the sensor signal is marked as slip 54 on the slip axis (abscissa axis).

Based on the measured slip 54 and the lower bound tire model 52a, a lower bound friction potential 58a may be estimated. However, this lower bound friction potential 58a is likely not to represent the actual friction potential, since the lower bound tire model was chosen or determined such that it likely underestimates the friction potential (or at least does not overestimate the friction potential).

Likewise, based on the measured slip 54 and the upper bound tire model 52b, an upper bound friction potential 58b may be estimated. However, this upper bound friction potential 58b is likely not to represent the actual friction potential, since the upper bound tire model was chosen or determined such that it likely overestimates the friction potential (or at least does not underestimate the friction potential).

As a result, an uncertainty value is be determined as the difference between the upper bound friction potential 58b and the lower bound friction potential 58a. This uncertainty value indicative of an uncertainty of the friction potential.

Figure 6:
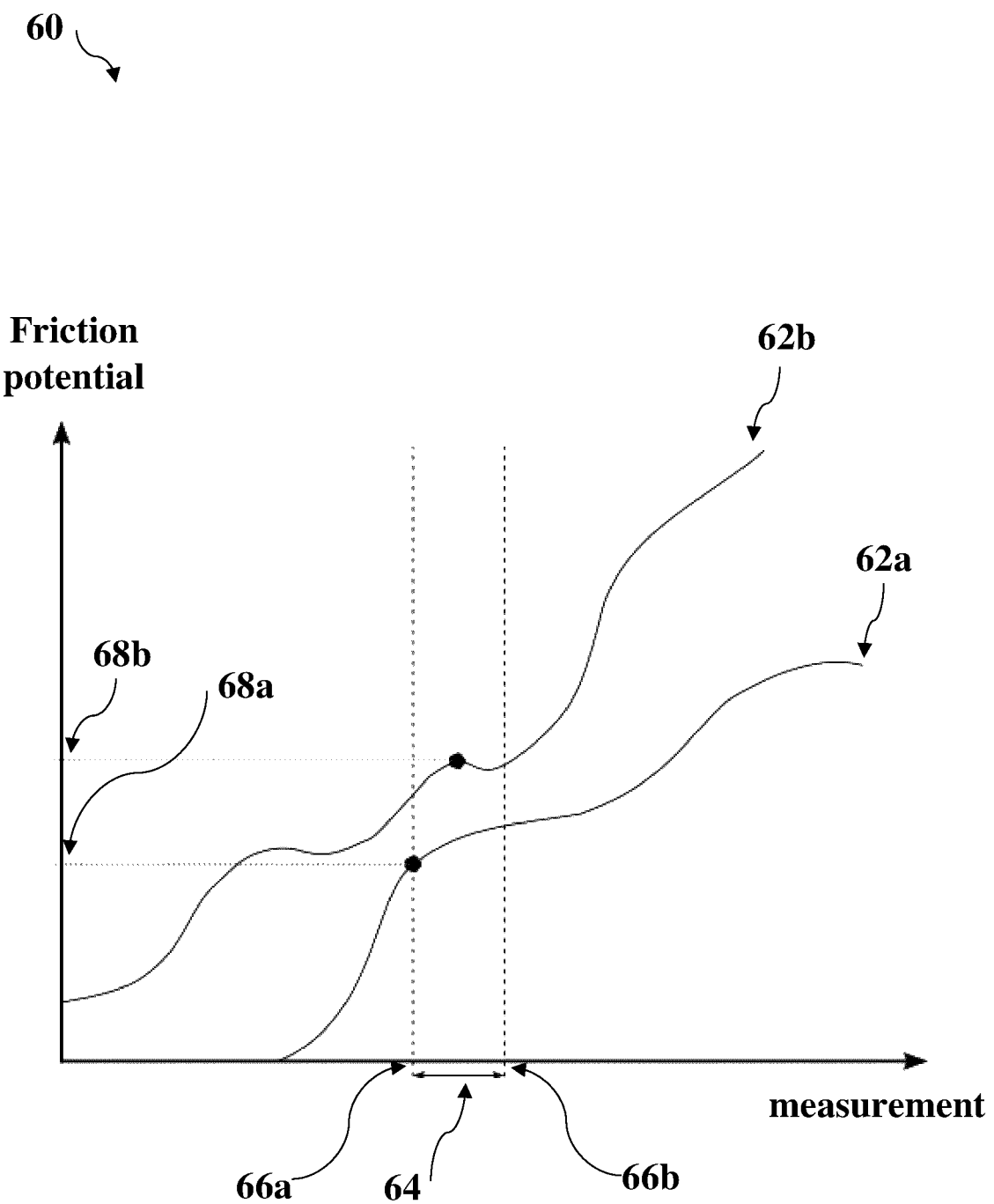
FIG. 6 is a graph illustrating an example of a method according to embodiments.

FIG. 6 is a graph illustrating a further example of a method according to some embodiments. In particular, contrary to the example of FIG. 5, the sensor signal is indicative not only of a single measurement value.

For illustrative purposes, the graph provides a direct relationship between an input to the tire model (measurement, actual tire-related value, such as slip) and a friction potential (i.e. maximum of a slip curve, which slip curve is not shown in FIG. 6).

In addition to an indication of the actual tire-related value (e.g. slip value), a measurement uncertainty value 64 is received along with the sensor signal or estimated based on the sensor signal. The measurement uncertainty value is indicative of an uncertainty of the actual tire-related value. For instance, it is indicative of a slip range, within which the actual slip is (likely) located. Such an uncertainty value may for instance be determined based on a known error of the sensor used for providing the sensor signal. Additionally or alternatively, it may be based on a statistic of multiple measurements.

In the example shown, the measurement uncertainty ranges from a lower bound measurement 66a to an upper bound measurement 66b. The measurement uncertainty may be provided as a simple, continuous range (defined by a lower bound and an upper bound) as illustrated in FIG. 6. Additionally or alternatively, the measurement uncertainty may be indicated by a discrete set of multiple values (such as a sequence of multiple measurements in time) or a distribution of values, indicative of the relative prevalence of each value within the measurement range.

Further, a confidence measure may be provided or computed, which indicates the likelihood of the actual slip value being located within the slip range indicated by the measurement uncertainty value. Exemplary confidence measures are 10, 20, 30 or 50. For instance, 10 represents a likelihood of approximately 68% for the actual slip value being within the indicated range.

In the case of FIG. 6, the calculating of the friction uncertainty value is based further on the measurement uncertainty value: Based on the lower bound tire model 62a, a lower bound friction potential 68a is estimated by determining the minimum friction potential 68a of the lower bound tire model 62a given that the input to the tire model is within the measurement uncertainty range 64.

Similarly, based on the upper bound tire model 62b, an upper bound friction potential 68b is estimated by determining the maximum friction potential 68b of the upper bound tire model 62b given that the input to the tire model is within the measurement uncertainty range 64.

An uncertainty value may then be determined as the difference between the upper bound friction potential 68b and the lower bound friction potential 68a. This uncertainty value is indicative of an uncertainty of the friction potential, given the uncertainty in tire and operational conditions (range of tire models) as well as the uncertainty in measurement of tire-related values (measurement uncertainty value).

In mathematical terms, the above may be expressed as follows:

One starts with the assumption of two tire model as boundaries; one upper bound model and one lower bound model that together box the true tire model. The actual friction potential will then lie within the two friction boundary estimates, $$\hat{\mu}_{max} \in [\hat{\mu}_{max,low}, \hat{\mu}_{max,up}]$$

and the uncertainty value is defined as the distance these two boundary estimates are spanning.

$$\hat{\mu}_{unc} = \hat{\mu}_{max,up} - \hat{\mu}_{max,low}$$

The general tire model boundary functions $f_{\hat{\mu}_{max,up}}(*)$ and $f_{\hat{\mu}_{max,low}}(*)$ shown in FIG. 6 can then be used to calculate the friction potential boundaries $\hat{\mu}_{max,up}$ and $\hat{\mu}_{max,low}$ given the measurements $Y=[y_1, \ldots, y_n]$.

$$\begin{cases} \hat{\mu}_{max,up}(Y) = f_{\hat{\mu}_{max,up}}(Y) \\ \hat{\mu}_{max,low}(Y) = f_{\hat{\mu}_{max,low}}(Y) \end{cases}$$

The measurements Y are indicative of actual tire-related values. In the example shown in FIG. 6, a single quantity is measured, i.e. $Y=y_1$. For illustration of a n-dimensional vector Y, an n+1-dimensional plot would be required.

Running the measurement(s) Y through the upper bound tire model gives an upper limit to the estimate and running the measurement(s) through the lower bound tire model gives a lower limit to the estimate. This way the uncertainty of the tire model is reflected in the estimated friction potential. Uncertainties in the measurements are easily included by feeding the two boundary models with $Z \in [Y_{low}, Y_{up}]$ and derive the maximum value for the upper boundary and minimum value for the lower boundary.

$$\hat{\mu}_{max}(Z) \in [\min(\hat{\mu}_{max,low}(Z)), \max(\hat{\mu}_{max,up}(Z))]$$

Considering FIG. 6, showing the problem in a two dimensional space, that is $Y=y_1$ and $Z \in [y_{1,low}, y_{1,up}]$, the friction potential boundaries are here given by the points $p_{max,up} = \max(f_{\hat{\mu}_{max,up}}(Z))$ and $p_{min,low} = \min(f_{\hat{\mu}_{max,low}}(Z))$ found in the interval of Z.

The same approach is applicable for the multidimensional space when $Y = [y_1, \ldots, y_n]$ and $Z \in [Y_{low}, Y_{up}]$. The tire model approach is neither limited to the measurement range approach and may also be used with single measurements $Z = E(Y)$ (as described above with reference to FIG. 5) or a combination of the two alternatives.

The two boundary tire models $f_{\hat{\mu}_{max,up}}(*)$ and $f_{\hat{\mu}_{max,low}}(*)$ may be interpolated or extrapolated when the data points spanning the tire model are few.

With this approach, friction potential estimates can be given while the boxed model still spans a large set of tire models, i.e. it does not require a convergence phase. In practice, this also imply that the friction estimate always will be at least as good as the data it has been fed with.

Figure 7:
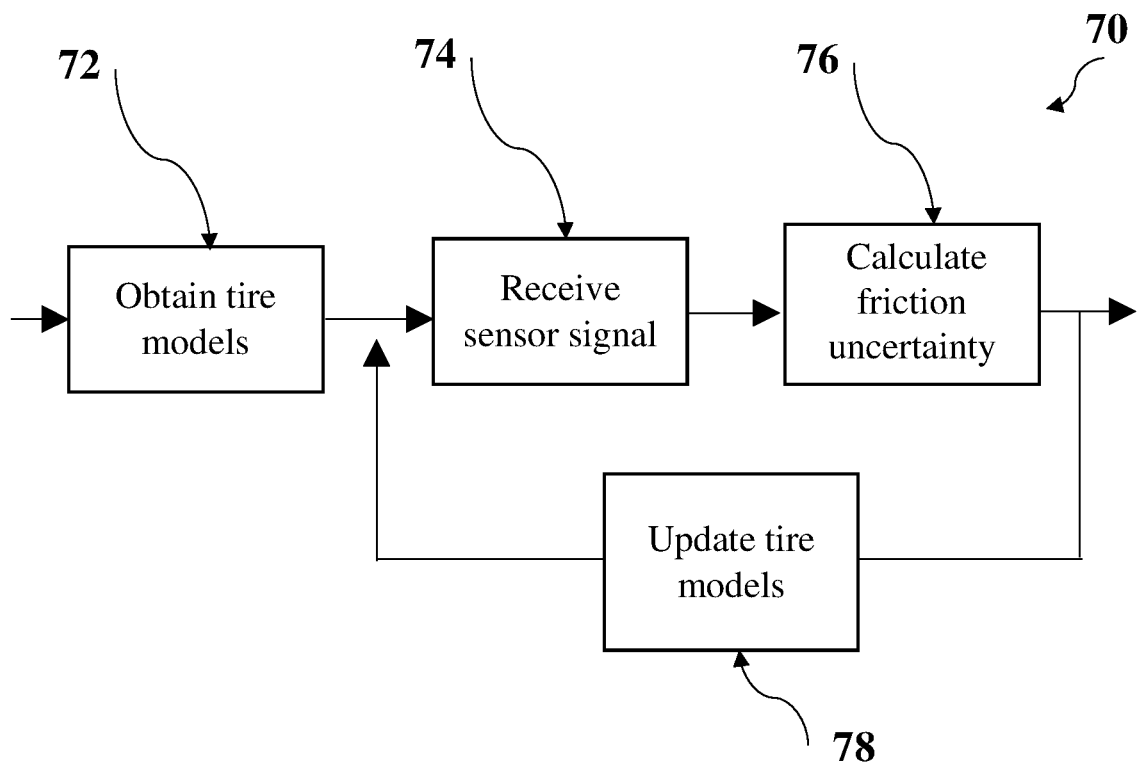
FIG. 7 is a flow chart of a method according to embodiments.

FIG. 7 is a flow chart of a method according to embodiments.

Similarly to embodiments described above, method 70 for estimating the uncertainty of a friction potential value of a wheel of a vehicle comprises obtaining 72 a range of tire models. Method 70 also comprises receiving 74 a sensor signal indicative of at least one actual tire-related value. Finally, the method comprises calculating 76 a friction uncertainty value based on the received sensor signal and the range of tire models, indicative of the uncertainty of the friction potential.

In addition, method 78 comprises updating the range of tire models. This may comprise updating at least one of the tire models out of the range, updating an upper and/or lower bound tire model and/or updating all tire models within the range of tire models.

The updating of one or more tire models may involve in particular updating parameters of the respective tire models, which parameter describe the tire model.

The updated tire models may replace the initially obtained tire models and be used in the next use of the method, in particular once a further sensor signal is received (step 74) and a further friction uncertainty value is calculated (step 76).

Such updating may allow that the range of tire models dynamically adjusts to the current tire and operating conditions. For instance, with a stable convergence of tire and operating conditions, the range of tire models may narrow down, leading to a decrease in uncertainty about the friction potential. If, on the other hand, tire or operating conditions change, the previously obtained tire models may no longer be valid and the updating allows to broaden the range of tire models as much as necessary in view of the changes, as will be described with reference to FIG. 8.

Figure 8:
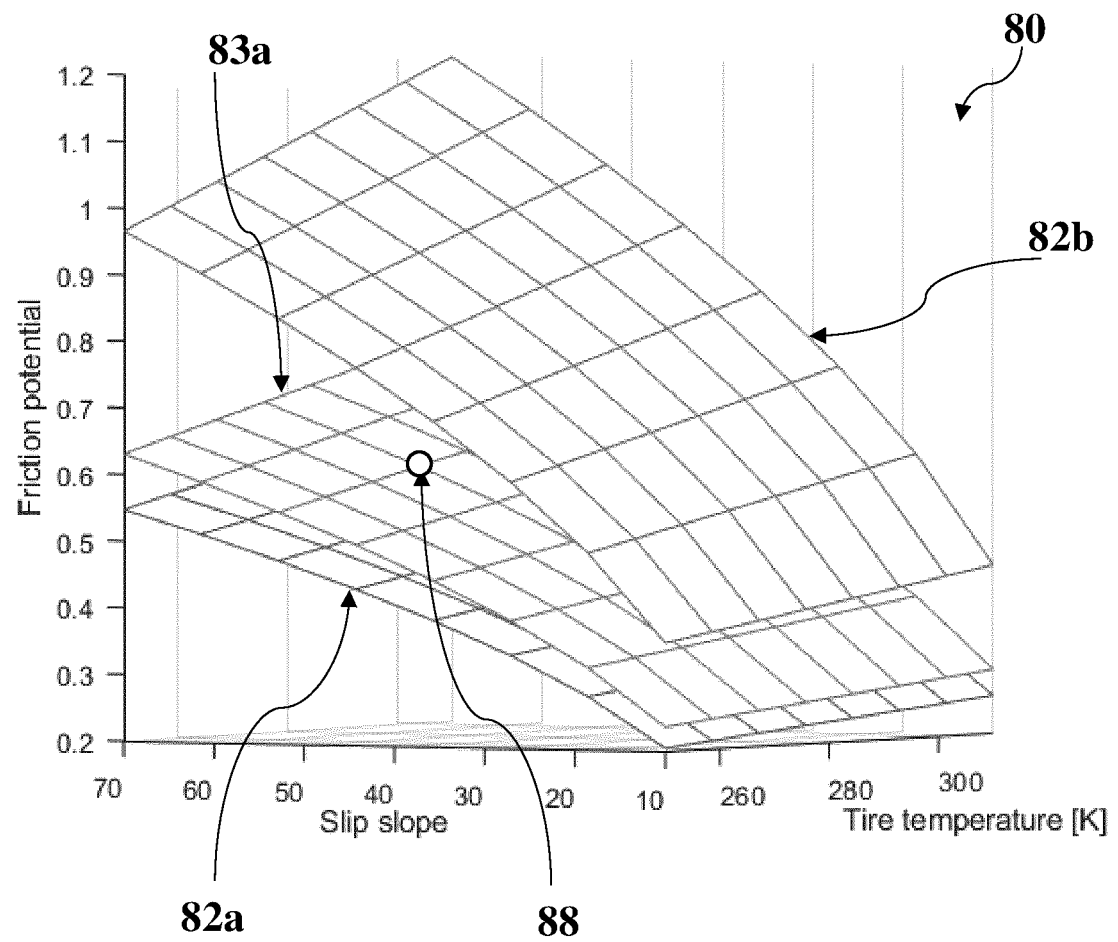
FIG. 8 is a graph illustrating an example of a method according to embodiments.

FIG. 8 is a graph 80 illustrating an example of a method according to embodiments.

A lower bound tire model 82a and an upper bound tire model 82b are obtained. In the graph 80, these models are represented by surfaces in a three-dimensional space, spanned by slip slope, tire temperature and friction potential. Mathematically, each model may for instance be represented by a function, such as be $\mu = a*T*\sqrt{k}$, where T is absolute temperature, k is the slip-slope, a is a parameter, and $\mu$ is the friction potential. In such an example, the lower and upper bound tire models 82a, 82b are characterized by a respective value of the parameter a, such as $a_{low}$ and $a_{up}$.

Then, signals indicative of tire-related values, e.g. slip slope and tire temperature, are obtained and used as an input to the tire models. In the example shown, the particular tire-related values may be a slip slope value of "53" and a tire temperature value of "275 K".

Based on these tire-related values, a lower bound friction potential is determined using the lower bound tire model and the obtained tire-related values. Further, an upper bound friction potential is determined using the upper bound tire model and the obtained tire-related values. In the example shown, the lower bound friction potential may be "0.5" and the upper bound friction potential may be "0.95".

If these output from the tire models (i.e. the values of friction potential) are inconsistent with an actual friction used 88 (e.g. provided by the vehicle bus or determined in a measurement), then at least one of the tire models may be updated.

In general, when a measurement is inconsistent with the obtained range of tire models, it may be assumed that either the measurement or the range of tire models is incorrect. Here, the range of tire models may be updated based on the measurement.

In the example shown, an actual friction used of "0.6" is obtained. This actual friction used corresponds to a certain point 88 in the three-dimensional representation of graph 80. This actual friction used is larger than the friction potential according to the lower bound tire model. An excess of friction used over friction potential represents an inconsistency, which leads to an updating of the corresponding tire model. As a result, in the example shown the parameter @low of the lower bound tire model is updated to ensure consistency with the actual friction used as represented by point 88. The updating provides updated lower bound tire model 83a, which will be used in further uses of the method. The updated tire model 83a replaces the previous lower bound tire model 82a.

Similarly, an upper bound tire model may be updated in case there is an indication of maximum possible friction being lower than the upper bound friction potential from the upper bound tire model. For instance, a friction potential estimate (such as obtainable from ABS braking) may be used as the maximum possible friction indication.

In the example shown, the tire model is updated over the entire range of tire-related values (slip slope and temperature). However, in other embodiments, the updating may apply locally to the actual tire-related values (e.g. at slip slope of "53" and temperature of "275 K") or to a range at and around these actual tire-related values. This may be the base in particular, where no tire model structure (e.g. as a mathematical function or parametrization) is known.

Figure 9:
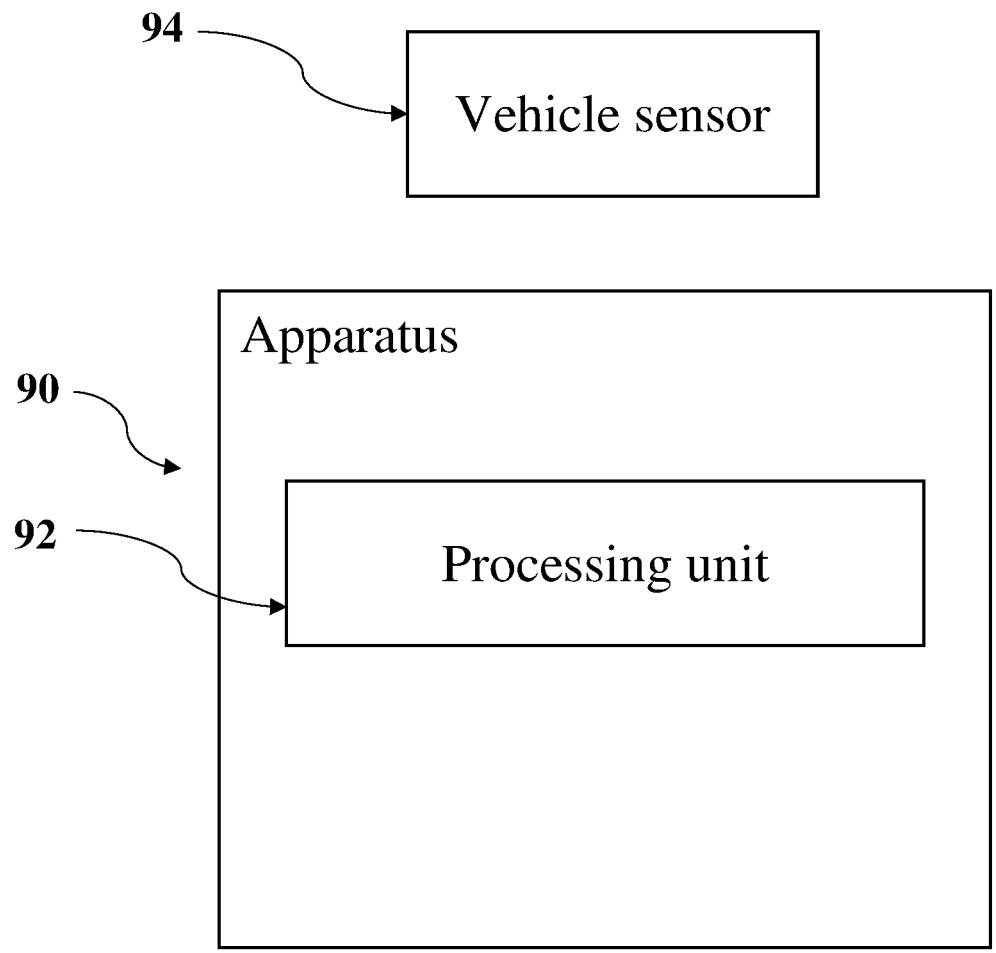
FIG. 9 is a box chart of an apparatus according to embodiments.

FIG. 9 depicts a box chart of an apparatus according to some embodiments. The apparatus 90 comprises a processing unit 92. The processing unit 92 is configured to estimate an uncertainty of a friction potential value of a wheel of a vehicle. To this end, the processing unit 92 is configured to obtain a range of tire models. The tire models may be provided by a device external or internal to the apparatus 90. For instance, they may be obtained by the processing unit 92 from a memory device (not shown) within apparatus 90 or external to apparatus 90. They may also be obtained from a vehicle bus.

Alternatively, the obtaining by the processing unit 90 may comprise obtaining parameters (e.g. from a vehicle bus) and providing these parameters to a blank tire model to obtain a range of tire models.

The apparatus is further configured to receive 34 a sensor signal. The sensor signal is indicative of at least one actual tire-related value. The tire-related values are provided by a vehicle sensor 94. In some embodiments, the apparatus 90 may comprise the vehicle sensor 94.

The processing unit 92 is configured to use the sensor signal (or tire-related values indicated therein) as an input to the tire models and estimate a friction uncertainty value based on the range of tire models, as described herein.

In some embodiments, the apparatus may further comprise a connectivity interface (not shown), which is adapted for communication with entities external to the vehicle, such as vehicle-to-vehicle or vehicle-to-infrastructure communication.

The term "vehicle connectivity" is understood to encompass any communication with entities external to the vehicle, such as vehicle-to-vehicle or vehicle-to-infrastructure communication. For instance, by using data provided over vehicle connectivity one vehicle may relay road-related or environment-related values (e.g. temperature) to other vehicles of a fleet (directly or via an intermediate entity such as a server or cloud service). The other vehicles of the fleet May calibrate their tire models instantaneously based on the relayed value(s).

The invention claimed is:

1. A method for estimating uncertainty of a friction potential value of a wheel of a vehicle, comprising:
   obtaining a range of tire models, the range of tire models comprising a lower bound tire model and an upper bound tire model, wherein the lower bound tire model is to underestimate an actual friction potential and the upper bound tire model is to overestimate the actual friction potential;
   receiving a sensor signal indicative of at least one actual tire-related value;
   estimating a lower bound friction potential value based on the received sensor signal and the lower bound tire model, the lower bound friction potential value is a peak value of the lower bound tire model;
   estimating an upper bound friction potential value based on the received sensor signal and the upper bound tire model, the upper bound friction potential value is a peak value of the upper bound tire model;
   calculating a friction uncertainty value based on the received sensor signal and the range of tire models, indicative of the uncertainty of the friction potential, wherein the calculated friction uncertainty value is based on a difference between the upper bound friction potential value and the lower bound friction potential value; and
   updating at least one of the lower bound tire model and the upper bound tire model in a case of inconsistency between at least one of the lower bound friction potential value and the upper bound friction potential value and an actual friction provided by a vehicle bus or determined in a measurement.

2. The method according to claim 1, wherein:
   the obtaining includes obtaining or estimating a tire model uncertainty, indicative of an uncertainty of the range of tire models; and
   the calculating of the friction uncertainty value is based on the tire model uncertainty value.

3. The method according to claim 1, wherein the at least one actual tire-related value is selected from a group comprising:
   slip, (normalized) traction force, ambient temperature, tire temperature, tire pressure, longitudinal acceleration, lateral acceleration, yaw rate, wheel speed, vehicle speed, engine speed, engine torque, torque applied on the wheel, ABS flag, steering wheel angle, wheel angles, suspension height, suspension pressure, axle height, brake pressure, brake temperature, brake torque, a tire type (manually entered via a human-machine-interface), GPS information, road wetness, road conditions, gearbox signals, wiper speeds, an estimated friction potential from an ABS braking, an estimated friction potential from a TCS event, an estimated friction potential received from vehicle connectivity, a flag value from a control flag register.

4. The method according to claim 3, further comprising estimating a friction potential value.

5. The method according to claim 4, further comprising providing one or more of: the calculated friction uncertainty, the estimated lower and upper bound friction values, or the estimated friction potential value to a vehicle bus for use in an active control system.

6. The method according to claim 1, wherein the sensor signal is received from one or more of the following:
   a wheel speed sensor, a vehicle speed sensor, a torque sensor, a pressure sensor, one or more accelerometers, a yaw rate sensor, a steering angle sensor, a temperature sensor, a torque distribution device, a GPS sensor, a camera, a vehicle bus.

7. The method according to claim 1, wherein:
   the receiving includes receiving or estimating a measurement uncertainty value, indicative of an uncertainty of the actual tire-related value; and
   the calculating of the friction uncertainty value is based on the measurement uncertainty value.

8. The method according to claim 7, wherein:
   the sensor signal and the measurement uncertainty value are indicative of a measurement range comprising a series of actual tire-related values.

9. The method according to claim 1, wherein the updating comprises updating parameters of the range of tire models.

10. The method according to claim 1, further comprising using the uncertainty of the friction potential value of the wheel of the vehicle for controlling the vehicle.

11. A non-transitory computer readable medium storing instructions that, when executed by a computing device, causes the computing device to perform steps including:
    obtaining a range of tire models; the range of tire models comprising a lower bound tire model and an upper bound tire model, wherein the lower bound tire model is to underestimate an actual friction potential and the upper bound tire model is to overestimate the actual friction potential;
    receiving a sensor signal indicative of at least one actual tire-related value;
    estimating a lower bound friction value based on the received sensor signal and the lower bound tire model, the lower bound friction potential value is a peak value of the lower bound tire model;
    estimating an upper bound friction potential value based on the received sensor signal and the upper bound tire model, the upper bound friction potential value is a peak value of the upper bound tire model; and
    calculating a friction uncertainty value based on the received sensor signal and the range of tire models, indicative of the uncertainty of the friction potential, wherein the calculated friction uncertainty value is based on a difference of the upper bound friction potential value and the lower bound friction potential value; and
    updating at least one of the lower bound tire model and the upper bound tire model tire model in a case of inconsistency between at least one of the lower bound friction potential value and the upper bound friction potential value and an actual friction provided by a vehicle bus or determined in a measurement.

12. The non-transitory computer readable medium according to claim 11, wherein:
the obtaining includes obtaining or estimating a tire model uncertainty, indicative of an uncertainty of the range of tire models; and
the calculating of the friction uncertainty value is based on the tire model uncertainty value.

13. An apparatus for estimating uncertainty of a friction potential value, the apparatus comprising a processing unit, the processing unit configured to perform steps including:
obtaining a range of tire models, the range of tire models comprising a lower bound tire model and an upper bound tire model, wherein the lower bound tire model is to underestimate an actual friction potential and the upper bound tire model is to overestimate the actual friction potential;
receiving a sensor signal indicative of at least one actual tire-related value;
estimating a lower bound friction potential value based on the received sensor signal and the lower bound tire model, the lower bound friction potential value is a peak value of the lower bound tire model;
estimating an upper bound friction potential value based on the received sensor signal and the upper bound tire model, the upper bound friction potential value is a peak value of the upper bound tire model; and
calculating a friction uncertainty value based on the received sensor signal and the range of tire models, indicative of the uncertainty of the friction potential, wherein the calculated friction uncertainty value is based on a difference of the upper bound friction potential value and the lower bound friction potential value; and
updating at least one of the lower bound tire model and the upper bound tire model tire model in a case of inconsistency between at least one of the lower bound friction potential value and the upper bound friction potential value and an actual friction provided by a vehicle bus or determined in a measurement.

14. The apparatus according to claim 13, wherein:
the obtaining includes obtaining or estimating a tire model uncertainty, indicative of an uncertainty of the range of tire models; and
the calculating of the friction uncertainty value is based on the tire model uncertainty value.

* * * * *